(12) United States Patent
Bastien et al.

(10) Patent No.: US 6,659,520 B2
(45) Date of Patent: Dec. 9, 2003

(54) BUMPER ASSEMBLY

(75) Inventors: Christophe Bastien, Coventry (GB); Mitchell John Haberfield, Leamington Spa (GB); Stephen Faithfull, Coventry (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,323

(22) Filed: Oct. 3, 2002

(65) Prior Publication Data

US 2003/0067179 A1 Apr. 10, 2003

(30) Foreign Application Priority Data

Oct. 6, 2001 (GB) .............................................. 0124108

(51) Int. Cl.[7] .............................................. B60R 19/03
(52) U.S. Cl. ..................... 293/120; 293/102; 293/133; 293/136; 293/109
(58) Field of Search .............................. 293/15, 36, 37, 293/120, 132, 133, 136, 109, 102

(56) References Cited

U.S. PATENT DOCUMENTS

| 3,694,018 | A | | 9/1972 | Levering |
| 4,386,799 | A | * | 6/1983 | Molnar ........................ 293/120 |
| 4,457,547 | A | | 7/1984 | Sekiyama et al. |
| 4,941,701 | A | * | 7/1990 | Loren .......................... 293/120 |
| 2001/0054826 | A1 | * | 12/2001 | Hirota ......................... 293/120 |

FOREIGN PATENT DOCUMENTS

JP       11-003935       1/1999

* cited by examiner

Primary Examiner—Stephen T. Gordon
Assistant Examiner—Lori L. Coletta
(74) Attorney, Agent, or Firm—Gigette M. Bejin

(57) ABSTRACT

A vehicle bumper assembly (10) comprising a hoop-like support (11) having a central aperture (19) surrounded by an upper beam (15) and lower beam (16) connected by outer portions (17 & 18), a resilient shell (12), and an undertray (13). The shell (12) is shaped to the support (11) and its lower portion (41) is backed by foam material (14) mounted on the lower beam (15) and its upper portion (42) is collapsible onto the upper beam (16). The undertray (13) and foam backed lower portion (41) provide spaced supports for the lower leg of a pedestrian.

12 Claims, 4 Drawing Sheets

BUMPER ASSEMBLY

BACKGROUND OF INVENTION

1. Field of the Invention

This invention relates to a bumper assembly and in particular an assembly for use on motor vehicles in particular cars and vans.

2. Background of the Invention

It is known that automobile bumpers should be designed to withstand small impact forces without damage, or at least minimum damage, occurring at low speeds. Typical low speeds occur during vehicle maneuvering whilst parking. However, modern bumper assemblies must also be capable of offering protection to pedestrians when impacted by a slow moving vehicle.

A known bumper assembly which is claimed to alleviate pedestrian injury is disclosed in GB-A-2322 602 which provides a bumper assembly which comprises a plastic shell mounted on a support rail with the space between the shell and rail being substantially foam filled with different density foams. In one embodiment the upper portion of shell is hollow and collapses on initial impact onto the foam filling which creates an inclined face which is intended to guide a pedestrian onto the bonnet where it is believed that the pedestrian is in less danger of injury.

SUMMARY OF THE INVENTION

The present invention provides an improved vehicle bumper with improved guidance for lifting a pedestrian onto the bonnet.

According to the present invention there is provided a bumper assembly comprising a hoop-like support having a central aperture surrounded by an upper beam and lower beam connected by outer portions and which is covered by a resilient shell part, the lower portion of the shell being backed by foam material mounted on the lower beam, with the upper portion of the shell being collapsible onto the upper beam, and a relatively rigid undertray located below and adjacent the lower beam and projecting forwards such that the undertray and foam backed lower portion of the shell provide substantially aligned spaced supports for the lower leg of a pedestrian.

The undertray, lower shell and upper shell may provide progressively decreasing resistance to impact.

The shell is preferably made from a polyolefinic material preferably from a polypropylene based material and may be mounted to the vehicle structure or alternatively may be mounted on the support. The foam is preferably a polyurethane foam which may vary in density, and depth across the width of the lower beam.

The open center of the support allows for a open center bumper assembly which facilitates vehicle engine cooling.

The hoop-like support is preferably formed from a glass fibre reinforced thermoplastics plastics materials and is preferably formed from a polycarbonate based material, for example: XENOY (trademark) available from General Electric. The support may include reinforcing ribs and panels. If necessary the support may include at least one reinforcing rib interconnecting the upper and lower beams. The center portion of the upper beam is preferably set backwards from the front surface of the backing foam on the lower beam such that a line connecting points on the upper beam and said front surface make an angle of inclination to the vertical of at least 12 degrees of arc.

The foam is preferably a hard foam having a density of between 60–80 gm/litre then the angle of inclination is about 12 degrees of arc whereas if the foam is a less dense foam having a density of between 30–45 gm/litre then the angle of inclination may be increased to take account of the deformation of the foam on impact to say 15–20 degrees of arc.

The lower central portion of the shell and foam backing provides a support for said lower leg which is located in use at a height of about 260–270 mm above ground, and the forward portion of the undertray provides a support which is located at about 220–240 mm above the ground, that is about 45 mm below the lower beam support.

The outer portions of the hoop-like support are preferably curved forwards.

BRIEF DESCRIPTION OF DRAWINGS

The invention will be described by way of Example and with reference to the accompanying drawings in which.

DETAILED DESCRIPTION

Figure 1:
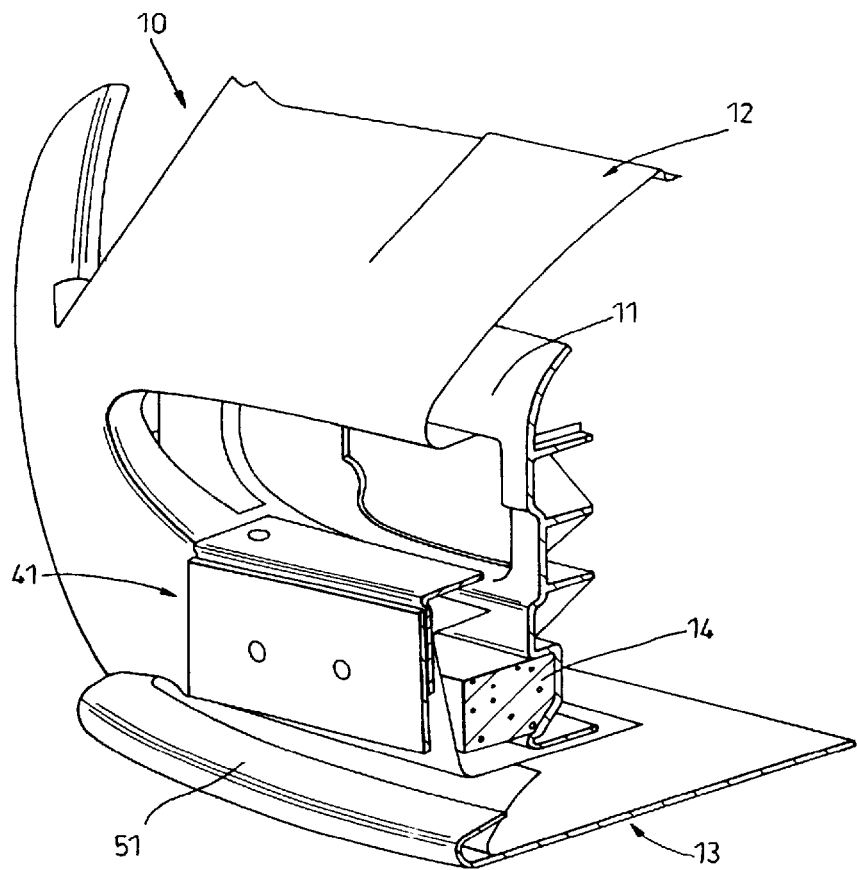
FIG. 1 is a cross-sectional view of a bumper assembly according to the present invention.
Figure 4:
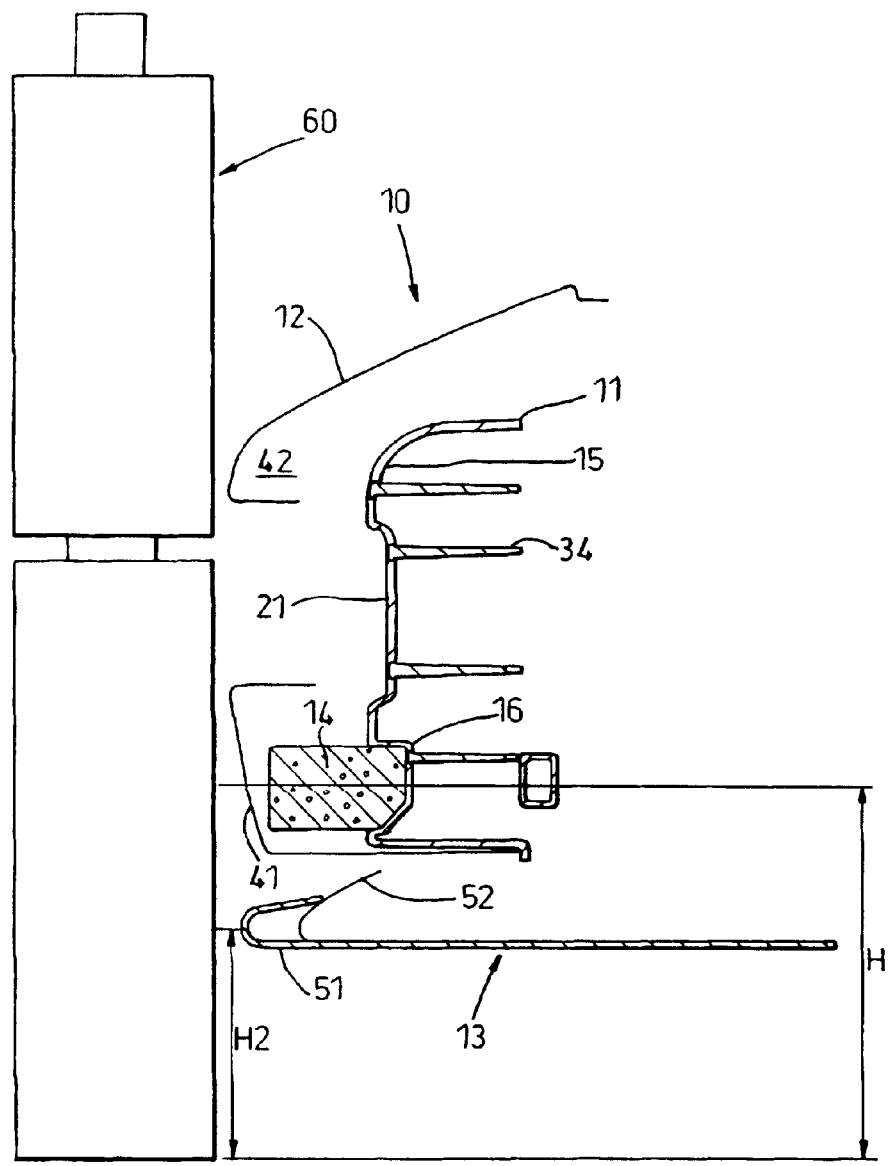
FIG. 4 is a cross-section of the bumper assembly of FIG. 1 taken on the vehicle longitudinal centre-line.
Figure 5:
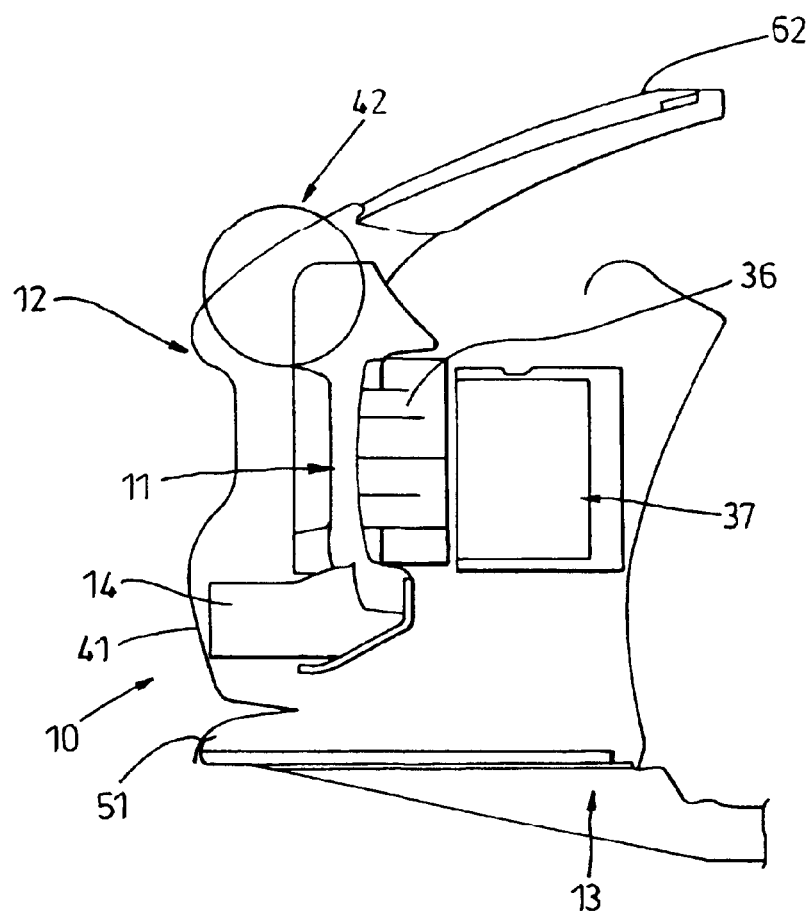
FIG. 5 is a side view of the bumper assembly of FIG. 1.

With reference to FIGS. 1, 4 and 5 there is shown a bumper assembly 10 friendly to pedestrians and which meets low speed impact requirements FMVSS581 and CMVSS215.

Figure 2:
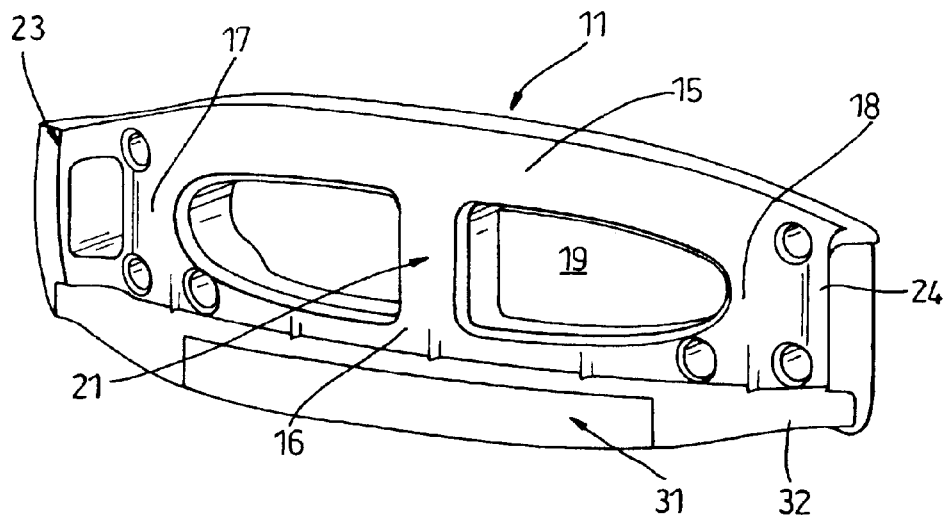
FIG. 2 is a front view of the hoop-like support with foam in -situ as is used in the bumper assembly of FIG. 1.
Figure 3:
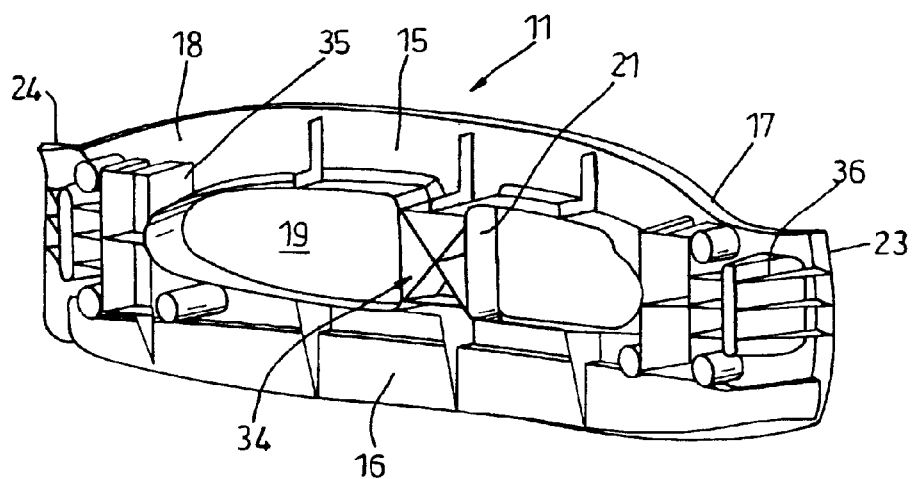
FIG. 3 is a rear view of the hoop-like support of FIG. 2.

The bumper assembly 10 comprises hoop-like support 11, a resilient cover or shell 12. an undertray 13 located beneath the support 11, and foam 14. The hoop-like support 11 is best seen in FIGS. 2 and 3 and is relatively rigid structure comprising a moulding of a polymeric material, preferably a polycarbonate material sold under he tradename XENOY available from General Electric and sold as bumper composite material. The support is fixed to the vehicle body and corn rises upper and lower beams 15 & 16 which extend across the width of the vehicle and are linked by side portions 17 and 18. The two beams 15 & 16 are spaced by about 250 mm and the two side portions are about 850 mm apart. The support 11 has a central aperture 19 and is strengthened by a central rib 21 which interconnects the two beams 15 and 16. The side portions 17 and 18 may extend into outer end portions 23 and 24 respectively which are curved forwardly. The forwardly curved end portions 23 & 24 help control low speed corner impacts.

The foam 14 comprises multi-density foam, preferably a polyurethane foam, mounted on the front surface of the lower beam 16 and may be arranged with higher density foam 31 in the central region and lower density foam 32 at the outer regions. The rear surface of the support has strengthening ribs and flanges 34, 35, 36, for example, moulded therein. The strengthening flanges and ribs may in use sit against crush cans 37 for absorbing impact loads.

The shell 12 is also hoop shaped to conform with the support 11 and is moulded from a resilient thermoplastic material such as a polypropylene which may include a percentage of ethylene propylene rubber. The shell is mounted to parts of the vehicle structure such the fenders and slam panel. The lower portion 41 of the shell is backed by the foam 14 mounted on the lower beam 15. Elsewhere, the shell 12 is spaced from the support by a clearance zone, see for example 42, which permits the shell to resiliently collapse onto the upper beam 15. Alternatively, but not shown the shell 12 may be mounted on the support 11.

The undertray 13 comprises a resilient polypropylene cover 51 mounted on a relatively rigid support 52 made of the same material as the hoop-like support 11. The support 52 is mounted on the vehicle structure and on impact the cover 51 may ride up the sloping front of support 51 and absorb some of impact energy.

Referring now to FIG. 4, a pedestrian leg is represented by the column 60 and the foam 14 on the lower beam is arranged so that its centre is at a height H of about 260–270 mm above the ground, that is ideally just below the centre of gravity of a typical tibia. The undertray is arranged at a height H2 above the ground of 220–230 mm and is substantially in alignment with the lower portion of the shell. The top beam 15 is set back from the front of the foam 14, for a higher density foam, by about 80 mm, such that a line passing through the front face of the foam 14 and the front of the upper beam 15 subtends an angle to the vertical of at least 12 degrees of arc. This angle may be increased for the use of lower density foams on the lower beam 16.

In an impact with a pedestrian, the shell 12 is resiliently collapsible onto the upper beam, the lower shell will be supported by foam 14 which will crush, and the cover 51 will be resiliently pushed against the undertray 13. The undertray 13 helps prevent the leg from passing under the vehicle and the lower shell and foam 14 together with the undertray 13 provide a two point support for the lower leg to try to prevent major injuries. The collapsing upper shell will tend to tip the pedestrian onto the bonnet 62 (see FIG. 5) of the vehicle. Thus the part of the bumper assembly controls the deceleration of the lower leg and the upper part controls the bend angle and shear displacement of the leg.

Furthermore the resistance to impact provided by the undertray 13, the lower shell and foam 14, and upper shell, may decrease with increasing height from the ground to ensure that the pedestrian is lifted onto the bonnet.

In a further embodiment the upper beam 15 may be covered in a low density foam.

What is claimed is:

1. A vehicle bumper assembly comprising:
   a hoop-like support having a central aperture surrounded by an upper beam and lower beam connected by outer portions and which is covered by a resilient shell part, the lower portion of the shell being backed by foam material mounted on the lower beam, with the upper portion of the shell being collapsible onto the upper beam; and
   a relatively rigid undertray located below and adjacent the lower beam and projecting forwards such that the undertray and foam backed lower portion of the shell provide substantially aligned spaced supports for the lower leg of a pedestrian.

2. A bumper assembly as claimed in claim 1, wherein the upper beam is set backwards from the front surface of the foam on the lower beam, such that a line connecting points on said upper beam and front surface makes an angle of inclination to the vertical of at least 12 degrees of arc.

3. A bumper assembly as claimed in claim 1 wherein the central portion of the lower portion of the shell provides a support for said lower leg which is located in use at a height of about 260–270 mm above ground.

4. A bumper assembly as claimed in claim 1 wherein the undertray support for the lower leg in use is located about 220 mm above the ground.

5. A bumper assembly as claimed in claim 1 wherein the undertray, lower shell and foam backing, and upper shell provide progressively decreasing resistance to impact upwardly from the ground.

6. A bumper assembly as claimed in claim 1 wherein the density of the foam differs across the width of the lower beam.

7. A bumper assembly as claimed in claim 1 wherein the support includes central rib which extends across the aperture interconnecting central portions of the upper and lower beams.

8. A bumper assembly as claimed in claim 1 wherein the outer portions of the hoop-like support are curved forwards.

9. A bumper assembly as claimed in claim 1 wherein the undertray is rigid and a resilient cover mounted thereon.

10. A motor car having a bumper assembly wherein the bumper assembly includes a hoop-like support having a central aperture surrounded by an upper beam and lower beam connected by outer portions and which is covered by a resilient shell part, the lower portion of the shell being backed by foam material mounted on the lower beam, with the upper portion of the shell being collapsible onto the upper beam; and
   a relatively rigid undertray located below and adjacent the lower beam and projecting forwards such that the undertray and foam backed lower portion of the shell provide substantially aligned spaced supports for the lower leg of a pedestrian.

11. A motor car as claimed in claim 10, wherein the outer portions of the bumper assembly are supported on crush cans located in front side portions of the vehicle.

12. A motor car as claimed in claim 10 wherein the shell is mounted to parts of the vehicle structure.

* * * * *